United States Patent [19]
Haws

[11] Patent Number: 5,380,075
[45] Date of Patent: Jan. 10, 1995

[54] FOOTED WHEEL FOR IRRIGATION APPARATUS

[76] Inventor: Spencer K. Haws, P.O. Box 318, Mesa, Wash. 99343

[21] Appl. No.: 200,062

[22] Filed: Feb. 23, 1994

[51] Int. Cl.⁶ .................................................. B60B 15/20
[52] U.S. Cl. ............................................ 305/5; 301/50; 280/5.2
[58] Field of Search .................. 305/1, 4, 5; 301/1, 301/5.1, 43, 44.1, 44.3, 45, 50; 280/5.2, 5.26, 5.28, DIG. 10

[56] References Cited

U.S. PATENT DOCUMENTS

| | | |
|---|---|---|
| 72,397 | 12/1867 | James . |
| 975,117 | 11/1910 | Bower . |
| 1,444,373 | 6/1915 | Morton . |
| 1,586,935 | 6/1926 | Wine ................................ 305/4 X |
| 1,629,126 | 5/1927 | Slauson ............................ 305/4 |
| 1,677,568 | 7/1928 | Slauson ............................ 305/4 |
| 1,705,796 | 3/1929 | Wine ................................ 305/4 X |
| 2,145,175 | 2/1939 | Dillingham .................... 305/11 |
| 4,759,638 | 7/1988 | McLaughlin .................... 305/5 X |

FOREIGN PATENT DOCUMENTS

| | | |
|---|---|---|
| 891799 | 3/1944 | France . |
| 303847 | 3/1917 | Germany ....................... 305/5 |
| 137145 | 12/1929 | Switzerland . |
| 190572 | 2/1922 | United Kingdom ........ 305/4 |

*Primary Examiner*—Russell D. Stormer
*Attorney, Agent, or Firm*—Keith S. Bergman

[57] ABSTRACT

A wheel to support a pipe, or a tower carrying a pipe, of an agricultural irrigation system, especially of a rotary type, provides a polygonal metal web with feet pivotally mounted by foot supports at the vertices of the web. The feet have relatively wide base elements for support on unstable wet earth that define depending protuberances oriented perpendicularly to the direction of travel of the wheel to minimize rut creation of waterflow along ruts in the earth being traversed. Foot supports carried by the wheel provide two spaced radially extending pivot elements about which the supported foot pivots in sequence in moving over supporting earth to lessen the vertical component of motion of the wheel. A species provides a movably mounted cleat on the outer surface of each foot to enhance traction and cleaning action

10 Claims, 5 Drawing Sheets

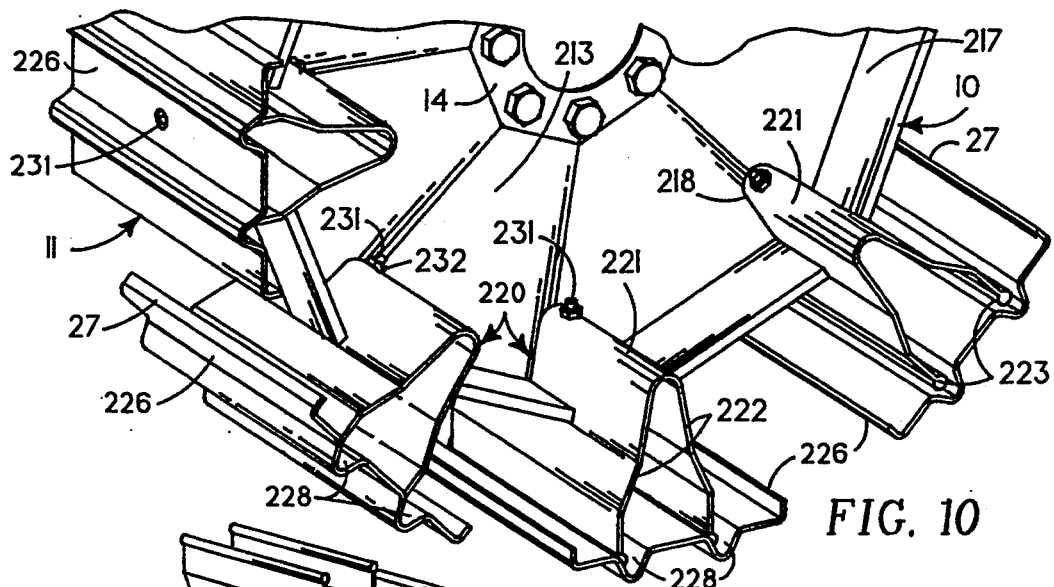
FIG. 10
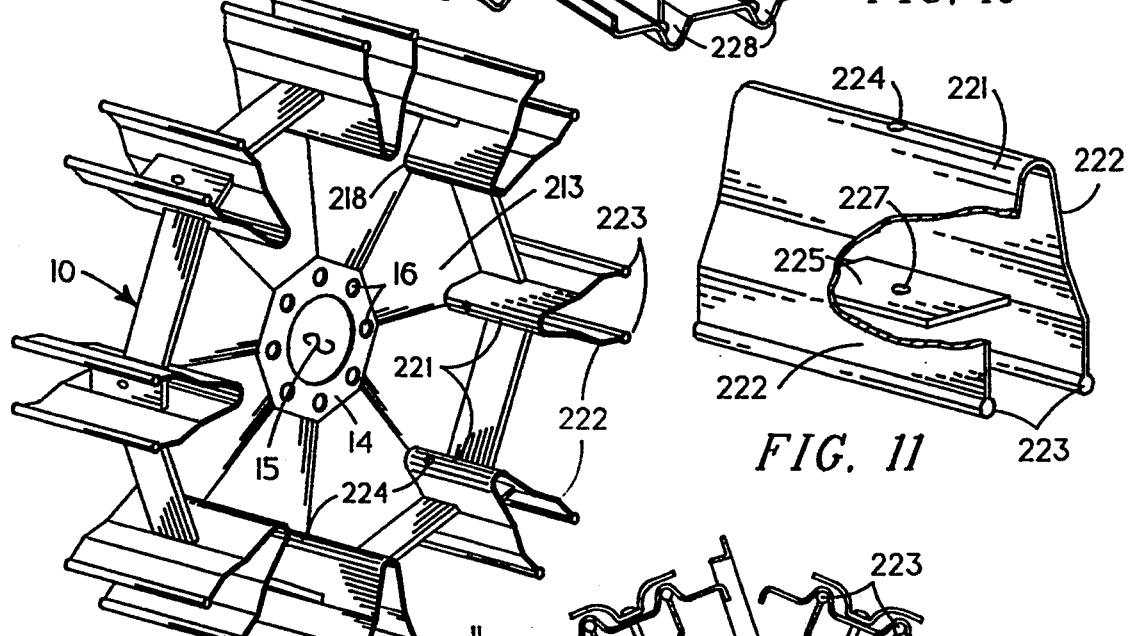
FIG. 8
FIG. 11
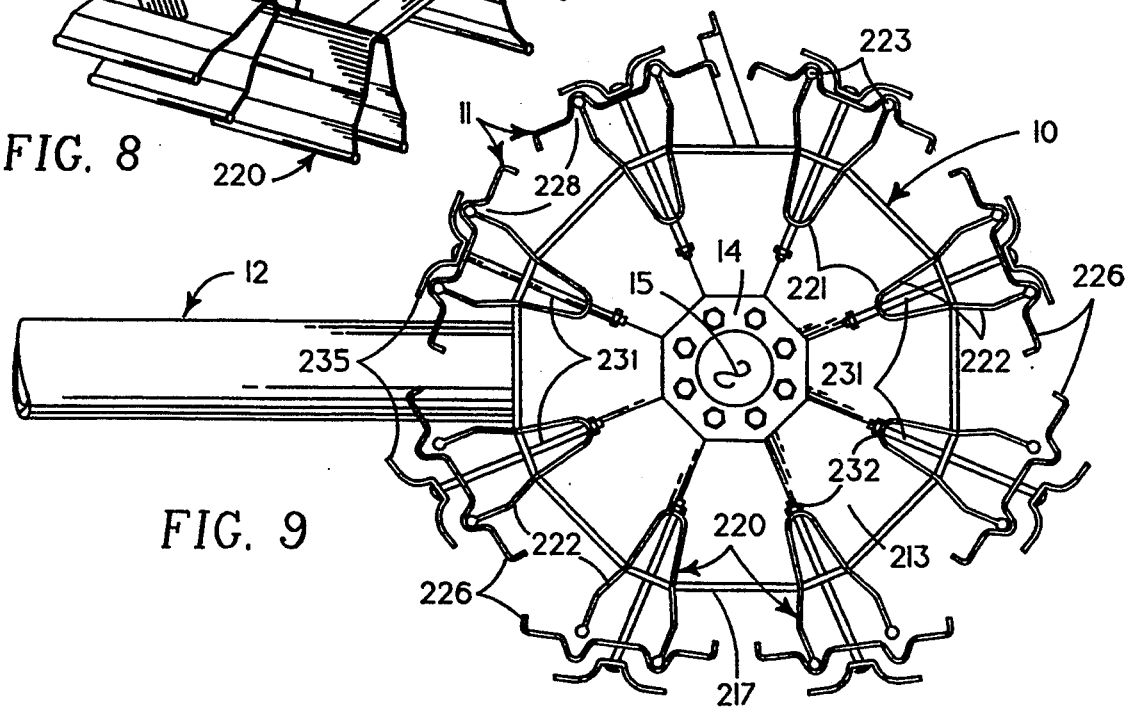
FIG. 9

FOOTED WHEEL FOR IRRIGATION APPARATUS

BACKGROUND OF INVENTION

1. Related Applications

There are no applications related hereto heretofore filed in this or any foreign country.

2. Field of Invention

My invention relates to footed wheels for irrigation apparatus and more particularly to such a wheel having plural pivotally articulated feet, each sequentially supporting two spaced support elements and optionally having a movably articulated cleat element.

BACKGROUND AND DESCRIPTION OF PRIOR ART

Transitting irrigation systems for agricultural field use are commonly supported on wheels for locomotion, either in a linear or circular course, about an area to be serviced. Such systems provide an elongate conduit for water supply to a plurality of spaced dispersement heads that distribute water over the irrigated area. Commonly such systems move cyclically in a regular pattern about an irrigated area which usually constrains the supporting wheels to pass over or close to prior courses of travel of those wheels. The area that the wheels traverse normally is wet by reason of the operation of the irrigation system and the wet soil commonly does not provide a stable support base for the wheels to allow the formation of ruts in the irrigated area and the accumulation of debris on the wheels.

Heretofore such systems commonly have been supported by wheels having pneumatic tires similar in nature to those used on farm vehicles. Such wheels, especially in heavier soils, form ruts that may become several feet deep and allow the accumulation on the wheels of mud and debris which can weigh one hundred pounds or more and interfere with operation and function of the irrigation system. Formation of ruts and accumulation of water in them tends to exasperate the problem as an irrigation operation is continued. The ruts and the removal of soil associated with their formation require an excessive expenditure of power for locomotion of irrigation apparatus, create field conditions that are difficult to manage in ordinary agricultural operations, interfere with movement of vehicles over the irrigated field, and tend to cause differential motion of various wheels relative to a supported pipe, which may change the linearity of the pipe to cause breakage, down time, additional maintenance, increased erosion and other similar problems.

My invention provides a footed wheel of non-pneumatic, metallic construction that resolves or substantially alleviates these problems.

Footed wheels have long been known, although they have not generally been used in agricultural endeavors, and especially for support of irrigation apparatus. Footed wheels used to increase traction on various vehicles commonly have provided a plurality of spaced foot elements which have a total surface area less than the area of a cylinder passing through the feet. This construction has not well adapted such footed wheels for support on loose, unconsolidated surfaces such as wet earth and mud common in irrigated fields because these footed wheels have less supporting surface area than an ordinary pneumatic tire of the same width. The structure of the instant wheel, however, provides foot pads of substantial size, both in radial length and lateral width, so that the surface area of pads supporting the wheel at any time may be substantially greater than the peripheral surface of an ordinary pneumatic tire, of the wheel carrying the pads. This provides a wheel structure having less propensity to form ruts than an ordinary pneumatic tire by decreasing the pressure per unit area on the ground surface supporting the wheel and by not continuously moving the foot surface relative to its support as a circular wheel does.

Ruts once formed tend to collect and channelize the flow of water to exasperate the problem of irrigation system transit and cause erosion in susceptible terrain. Known footed wheels generally have not been concerned with this problem because they have not commonly been used with irrigation systems. The instant invention addresses this problem by providing wheel feet with traversely extending grooves and ridges so that a surface traversed by the wheel tends to be configured in a similar fashion with complementary ridges and grooves formed by the foot. These surface features tend to disrupt water flow along a rut to aid in preventing erosion and in better distributing water contained in a rut in a lateral direction. The irregular foot surface provides a secondary benefit in providing increased traction for the wheel.

Unlike conventional wheels with circular peripheral surfaces, the rotation of a footed wheel results in a periodic vertical motion of the wheel hub relative to a supporting surface. This motion is of a complex cycloidal nature, as the hub moves in an arc about support on a foot that is temporarily fixedly supported relative to the ground being traversed. Vertical hub motion may cause accelerated wear in irrigation apparatus and may tend to enhance rut formation and development. Prior footed wheels have addressed this problem in various ways. Some have increased the number of feet to more closely approximate roundness, but in so doing have lost advantages of a footed wheel as the function of such a footed wheel tends to approximate the function of a wheel with a continuous circular peripheral surface. Other footed wheels have provided foot mounting linkage designed to extend and retract the feet in a radial direction responsive to wheel motion. These wheels have had the disadvantage of complexity and have resulted in increased power usage, maintenance and cost with a loss in reliability. The instant invention addresses the problem of vertical hub motion by providing two spaced support points on each foot about which the foot support pivots in sequence. Such spaced support points allow each foot to remain in contact with the ground longer and move less during wheel transit, reduce the number of feet required for a wheel and the complexity of the wheel, and promote smoother operation than would result with twice as many feet with single pivot points.

The accumulation of mud and debris on a wheel associated with an irrigation system tends to remove material from the path of the wheel to aid the formation of ruts and increase wheel friction and weight which requires more power for locomotion and increases wear, stress and strain on the wheel mechanism to shorten the useful life of the apparatus and require greater maintenance. Footed wheels are susceptible to these problems by reason of their compound structure but various means have become known to lessen the accumulation of mud and debris on them. Some structures have provided outwardly biased piston-like elements in the foot structure to move inwardly when the foot is in supporting position and outwardly thereafter to cause release of mud and debris. This type of structure is not particularly effective because it often allows the accumulation of mud that otherwise would not accumulate were it not for the structure itself, it is not very reliable and it requires excessive maintenance. Other attempts have been made to particularly configure the lower surface of wheel feet to cause release of debris or prevent its accumulation in the first instance, but in general these attempts have only caused the accumulation of debris that otherwise would not accumulate were it not for the particular configuration and they commonly have not effectively released the accumulated debris. The instant foot addresses this problem by providing a pan-shaped configuration with an outer supportive surface of substantial area and relatively smooth, somewhat planar configuration, which is not conducive to the accumulation of debris in the first instance or its positional maintenance on the foot. The motion of the foot relative to the supporting earth primarily occurs near the forward and rearward edges of the foot rather than over the entire foot surface which again discourages debris accumulation and encourages its dislodgement.

A species of foot provides a separate articulated cleat, carried outwardly of the medial portion of the outer foot surface, which by reason of its configuration and support moves responsive to motion of the foot to tend to dislodge debris that may have accumulated on either the cleat or foot. This cleat also serves to increase traction of the wheel.

All of these features distinguish my footed wheel from those heretofore known. My invention resides not in any one of these individual features, however, but rather in the synergistic combination of all of its structures which necessarily give rise to the functions flowing therefrom.

SUMMARY OF INVENTION

The instant invention provides a footed wheel to support the water supply pipe, or a secondary structure supporting such a pipe, in a transitting agricultural irrigation system. The wheel provides a medial web defining a central hub and supporting a polygonal peripheral rim with radially extending metal feet pivotally mounted at the vertices of the rim. The metal feet provide radially outer surfaces for support on loose wet soil with protuberances extending perpendicularly to the direction of wheel travel to create alternating indentations and ridges in the earth traversed. Each foot is attached to and supports a foot support member carried by the wheel rim to provide two spaced pivot elements about which the foot support member will move in sequence as the wheel moves in a linear course over supporting earth.

A species of foot provides a cleat movably mounted on the radially outer surface the foot to move responsively to motion of the foot on supporting earth to aid traction and dislodgement of debris from the cleat and the foot.

In providing such a mechanism, it is:

A principal object to provide a footed wheel that during transit is supported on each foot sequentially by two spaced pivot elements to reduce cyclic vertical motion of the hub while at the same time minimizing mechanical complexity and the number of feet required on a wheel.

It is a further object to provide such a wheel that has radially outer foot surfaces with laterally extending protuberances designed to minimize rut formation and reduce water flow within ruts.

A still further object is to create such a wheel that may have cleats movably mounted on the radially outer surfaces of the foot to move relative to the foot responsively to transitory motion of the wheel over a supporting surface to increase traction and aid in removing mud and debris from both the foot and the cleat.

A still further object is to provide such a wheel that is of new and novel design, of rugged and durable nature, of simple and economic manufacture and otherwise well adapted for the uses and purposes for which it is intended.

These and other objects of my invention will appear from the following specification and the accompanying drawings which form a part hereof. In carrying out the objects of my invention, however, it is to be remembered that its accidental features are susceptible of change in design and structural arrangement with only one preferred and practical embodiment of the best known mode being illustrated and specified as is required.

BRIEF DESCRIPTION OF THE DRAWINGS

In the accompanying drawings which form a part hereof and wherein like numbers of reference refer to similar parts throughout:

FIG. 8 is an isometric view of a wheel web embodying a third species of wheel having a unitary foot support that is welded to the wheel hub.

FIG. 9 is an orthographic side view of the third species of wheel showing feet and associated cleats carried by the foot supports.

FIG. 10 is a somewhat enlarged partial isometric view of the lower portion of the wheel of FIG. 9 with cleats removed to show its structure in more detail.

FIG. 11 is a cut-away, somewhat enlarged isometric view of a foot support of the third species of my footed wheel.

DESCRIPTION OF THE PREFERRED EMBODIMENT

Figure 1:
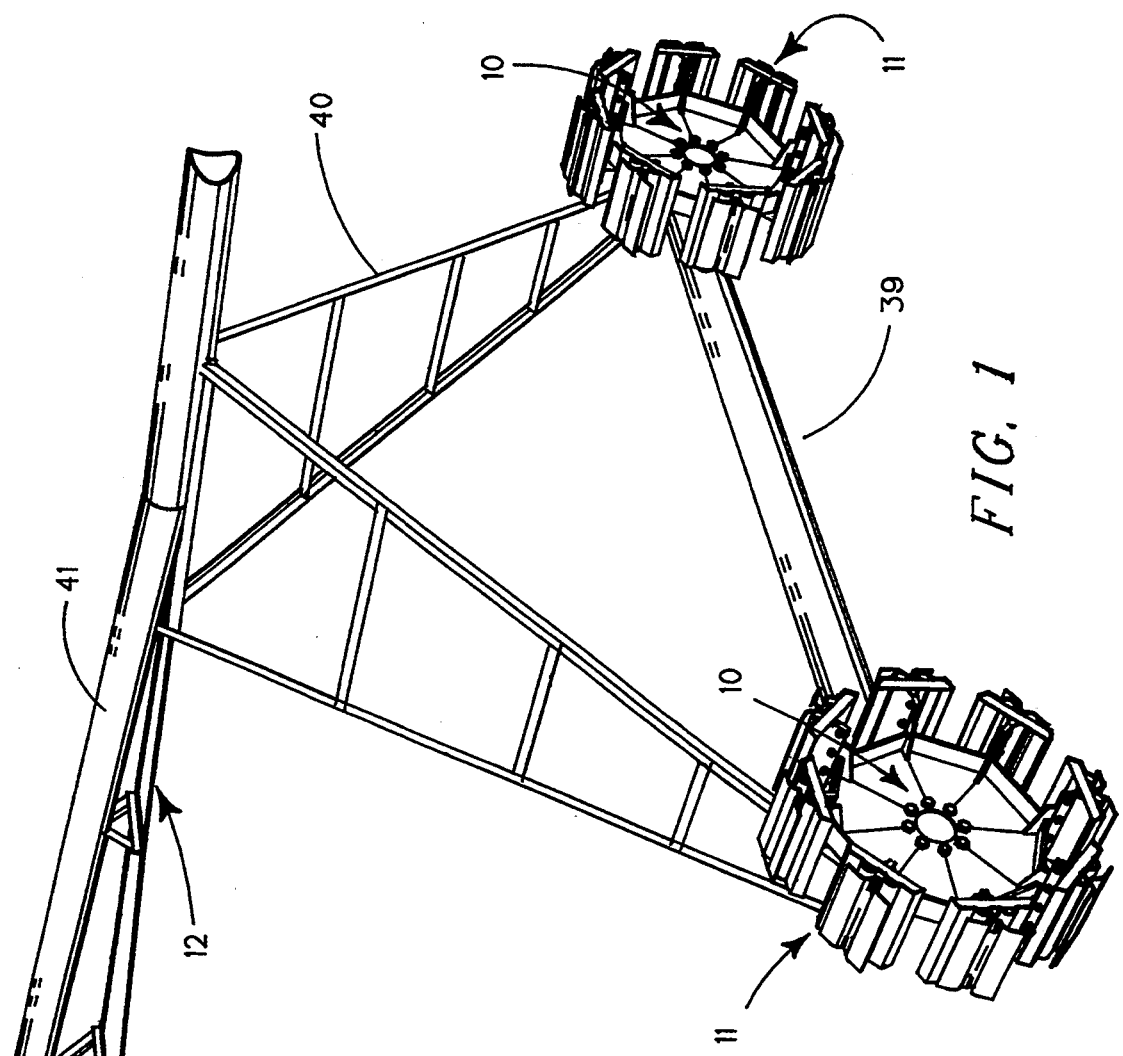
FIG. 1 is an isometric view of two of my footed wheels supporting a typical tower which in turn supports a supply pipe of an irrigation system for transit about a field.
Figure 3:
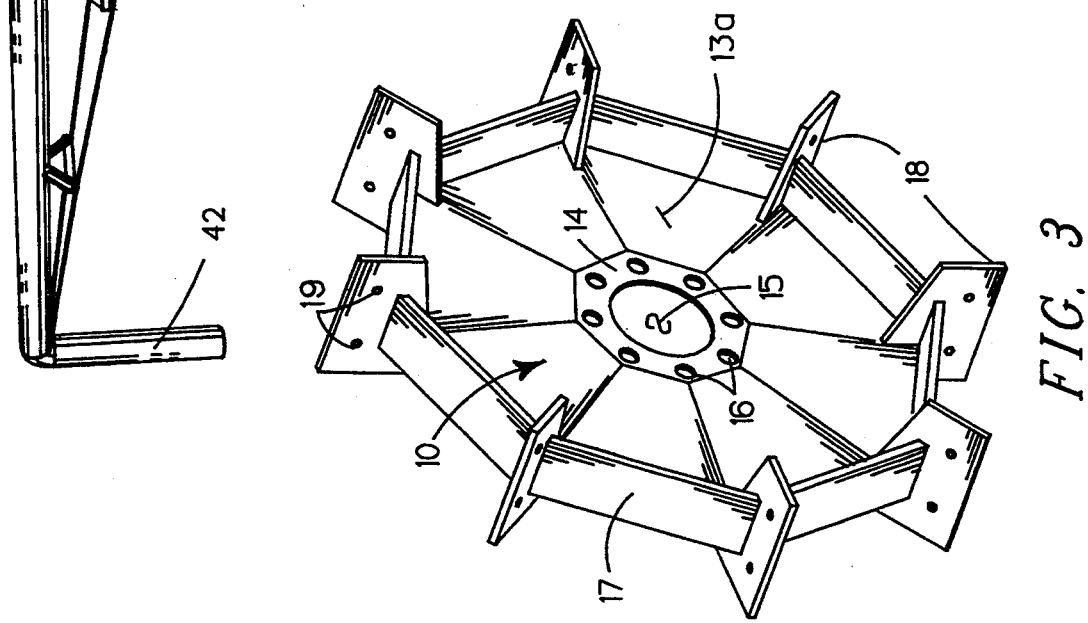
FIG. 3 is an isometric view of the wheel web of FIG. 2 with the foot structures removed.
Figure 2:
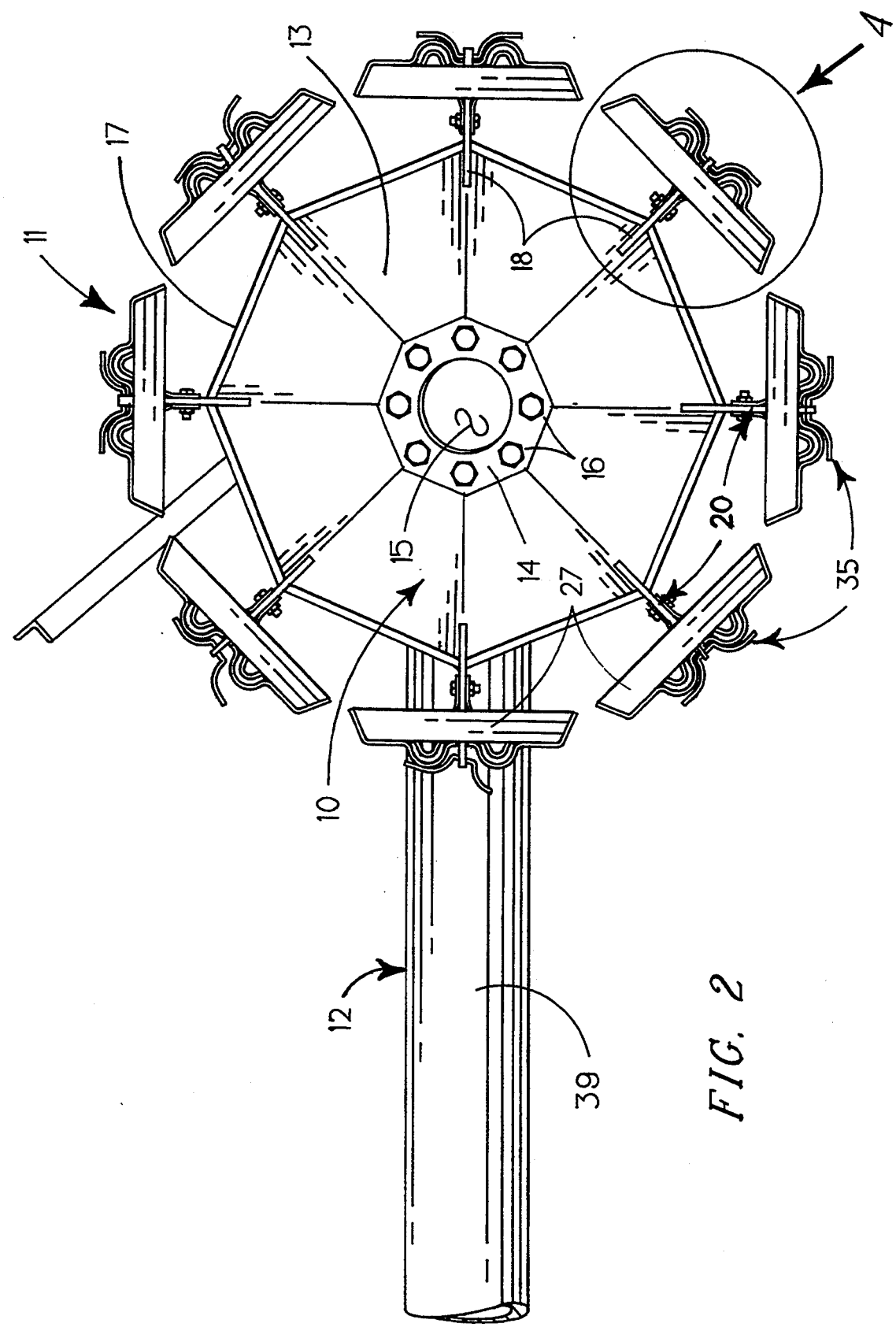
FIG. 2 is a somewhat enlarged orthographic side view of a footed wheel of FIG. 1, taken from the right side of that Figure.

My invention generally provides wheel 10 pivotally carrying plural feet 11 about its periphery to support irrigation system 12 during transit over an area to be irrigated.

In the first species of FIGS. 1–5, wheel 10 provides somewhat concave web 13 with the peripheral shape of a regular polygon, in the instance shown an octagon. The medial portion of web 13 defines planar hub 14 which in turn defines axle orifice 15 and plural spaced lug holes 16 outwardly adjacent the axle orifice. The configuration and array of the axle orifice and lug holes are similar to those same elements in wheel carrying ordinary pneumatic tires presently used in many irrigation systems to allow use of my footed wheel in that existing mechanism. The wheel configuration is not critical so long as it allows mounting of my wheel on apparatus that carries it, and variations, especially of size, required for adaptation to particular irrigation apparatus are within the ambit and scope of my invention.

The periphery of web 13 structurally carries circumferential rim 17 extending perpendicularly from concave side 13a of the web. The adjacent edges of the elements forming web 13 and circumferential rim 17 may be rounded to provide greater strength and structural rigidity to the wheel. Foot mounting plates 18 extend radially from structural interconnection with the wheel web through the apexes of circumferential rim 17 and a spaced distance radially outwardly therefrom to attach feet 11. The foot mounting plates 18 are structurally joined to the adjacent portions of both web 13 and rim 17.

Preferably all of the wheel elements described are formed of steel and if so, the structural joinder of parts is preferably accomplished by welding. The radially inward edge portions of wheel mounting plates 18 are angulated in the illustrations, but this configuration is not essential to my invention. The portion of the mounting plates 18 radially outward of rim 17 define pairs of laterally spaced holes 19 to allow bolted interconnection of foot structure 11 therewith.

Figure 4:
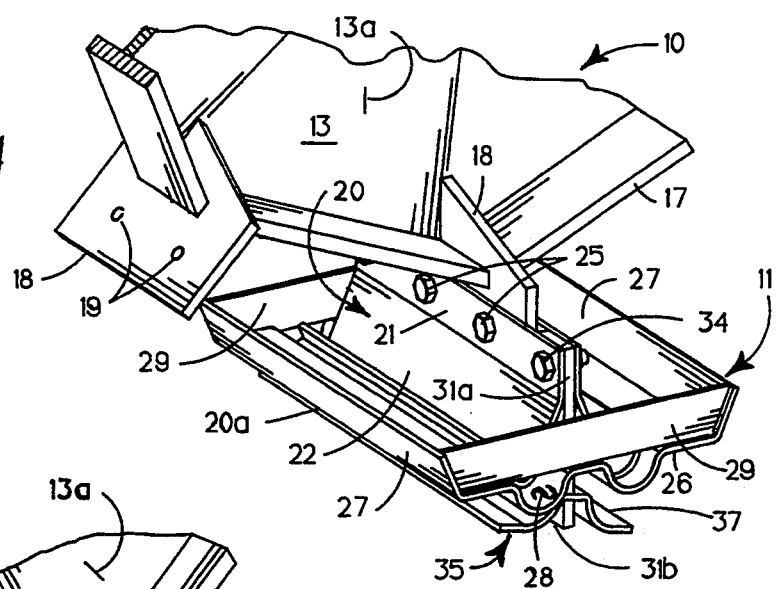
FIG. 4 is an enlarged partial isometric view of a wheel foot of FIG. 2 in a wheel supporting position.
Figure 5:
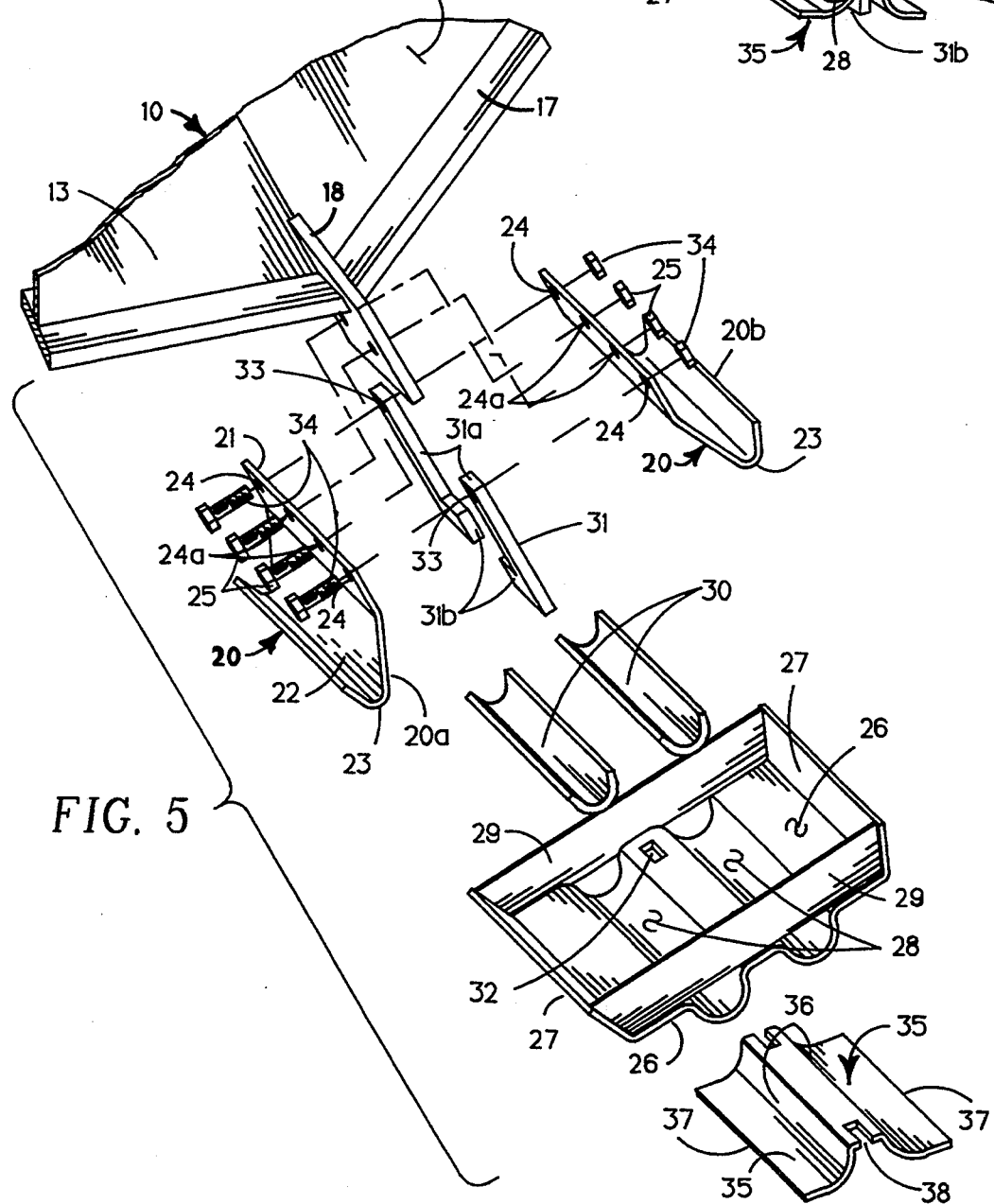
FIG. 5 is an expanded isometric view of a foot of FIG. 2 showing its various parts, their configuration and relationship.

Foot structure 11 is shown in FIGS. 4 and 5. "Y" shaped foot support 20 is formed by two similar halves 20a and 20b, each of an elongate nature with a length greater than the lateral dimension of wheel mounting plates 18. The radially inner portion of each foot support defines fastening flange 21 structurally communicating with outwardly flaring body 22 which defines rounded pivot portion 23 in its radially outermost extension. The fastening flange defines spaced pairs of bolt holes 24 to align with bolt holes 19 in the mounting plates 18 to receive nut-bolt combinations 25 therebetween to releasably fasten two foot support elements 20a, 20b on each side of an associated wheel mounting plate 18.

The foot plate in the first species of FIGS. 1–5 is an open box-like structure formed by bottom 26 having angulated ends 27 and interconnecting similar side plates 29 extending between ends 27. The medial portion of the foot plate defines two spaced laterally extending pivot grooves 28 so positioned as to receive the pivot portions 23 of an associated foot support 20 in sequence as a supporting wheel moves relative to the foot plate in supporting position on the earth. The distance between the two side plates is greater than the length of foot support 20 to allow pivot portions 23 to access pivot grooves 28 defined by foot plate bottom 26.

Optionally, bearings 30 of semi-circular cross-section may be positioned in pivot grooves 28 to receive cylindrical pivot portions 23 of the foot support and allow motion between these elements with lessened friction. If such bearings are used, they preferably are formed of one of the plastic materials commonly used for bearing surfaces such as fluorocarbon or polycarbonate materials. These bearings are not essential to my invention and the feet are operative without any bearings. If bearings are used, they preferably have an axial length somewhat greater than the distance between side plates 29 so that the side plates will positionally maintain the bearings. Preferably the size of pivot portions 23, cylindrical bearings 30, if used, and pivot grooves 28 are related so that each adjacent surface is substantially of the same configuration and dimension as the surface which bears upon or supports it.

Similar opposed "L" shaped fastening arms 31 maintain the assemblage of the foot support and foot plate. Each fastening arm is formed by radially extending longer arm 31a and laterally extending shorter arm 31b. The radially inner end portion of each longer arm defines elongate bolt slot 33. The thickness of at least the inner portion of longer arm 31a is incrementally less than the thickness of wheel mounting plate 18 so that, when fastening arm 18 is fastened between the foot support elements 20a, 20b, the fastening arm may move within limits in a radial direction as allowed by slot 33.

Foot plate 26 defines paired opposed fastening arm slots 32 between foot grooves 28 and inwardly adjacent its lateral edges. These slots 32 are incrementally larger than the fastening arm portion 31a to be carried therein to allow limited motion of the foot plate relative to the fastening arm but yet maintain assemblage. Fastening flange 21 of the foot support defines fastening arm holes 24a, laterally inwardly adjacent each of its ends and outwardly of the paired holes 24, to receive nut-bolt combinations 34 to releasably mount the longer arm 31a of the fastening arm between the fastening flanges.

To assemble the foot structure as illustrated in FIG. 5, the two foot supports 20a, 20b are positioned on wheel mounting plate 18 and fastened thereto by nut-bolt combinations 25. The bearings 30, if used, are positioned in pivot grooves 28 and the foot plate assembly is moved adjacent to the foot support 20. Fastening arms 31 are then inserted through fastening arm slots 32 defined in foot plate bottom 26, with their shorter arms projecting laterally inwardly in the instance illustrated, and are fastened by nut-bolt combinations 34 between the supports 20a, 20b to releasably maintain the assembled mode of the foot structure.

Cleat 35 optionally may be provided on the radially outer side of the foot. This cleat is somewhat areally smaller than foot bottom 26 and has the same medial surface configuration as the medial portion of the foot plate bottom. The cleat defines two spaced, laterally extending rounded portions 36 to allow it to fit immediately outwardly adjacent the portion of the foot bottom between pivot grooves 28. The elongate edge portions 37 of the cleat extend somewhat beyond pivot grooves 28 and are of planar configuration to extend tangentially to rounded portions 36 and parallel to the planar surface of the foot bottom. The lateral width of the cleat is substantially the same as foot plate bottom 26. Fastening arm slots 38 are defined in the cleat to extend inwardly from the medial portion of each lateral cleat edge a distance substantially equal to the inward extension of the fastening arm slots 32 defined in the foot plate bottom to allow fastening on the foot by the fastening arm 31.

With the cleated sub-species of my invention, the longer portion 31a of the fastening arm is formed with an additional length slightly greater than the thickness of cleat 35. The cleated version of my foot is assembled in the same fashion as described for the foot without a cleat, except that the longer arm 31a of the fastening arm is inserted through fastening arm slots 38 in the cleat before the fastening arm is inserted through slot 32 in the foot plate bottom 26.

Figure 6:
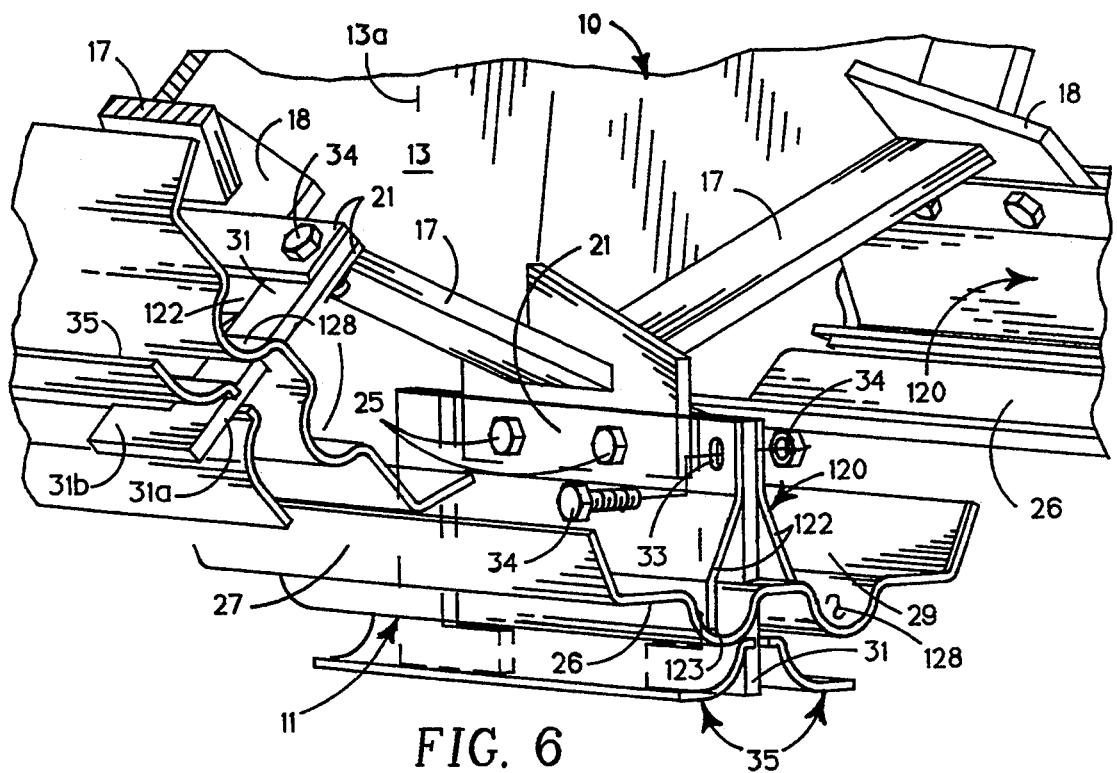
FIG. 6 is a partial isometric view showing a second species of foot structure having a cleat associated therewith.
Figure 7:
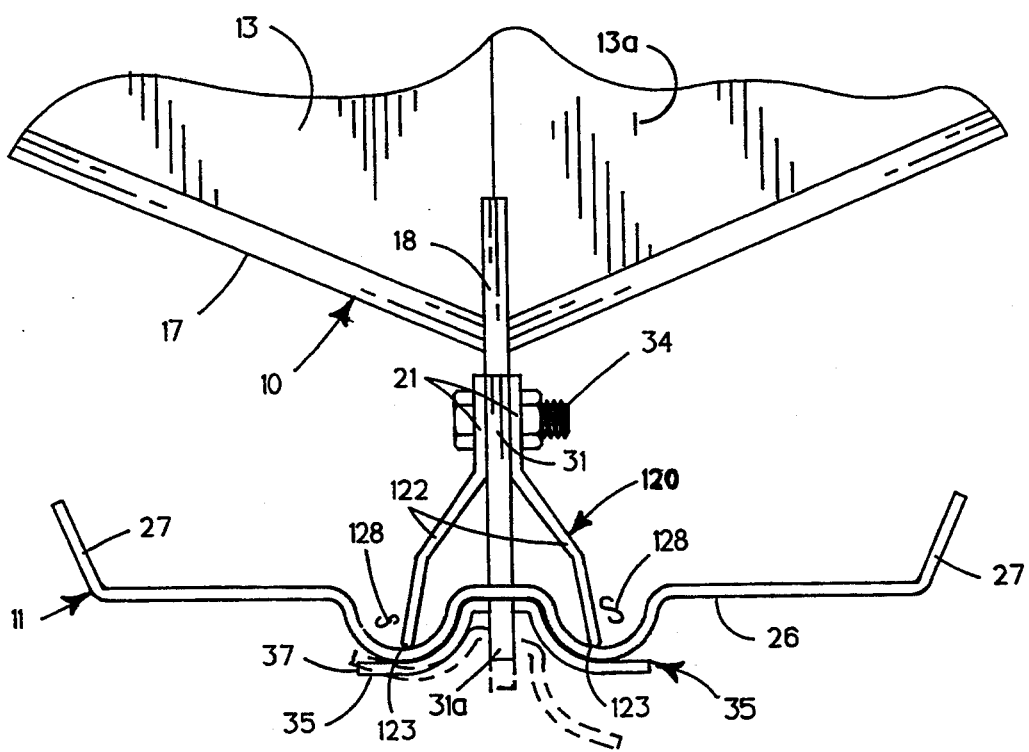
FIG. 7 is a partial side view of a foot of FIG. 6 showing the foot in wheel supporting position with the cleat shown in dashed outline in the alternative traction and cleaning position.

A second species of foot structure is shown in FIGS. 6 and 7. Here the pivot portion 123 of the foot support 120 comprises merely the outer edge of flaring body 122. The pivot grooves 128 are formed with a somewhat smaller cross-sectional shape to better accommodate and support pivot portion 123 and no bearing is used. The flaring body 122 of foot support 120 in this species is somewhat angulated to allow a better fit of the pivot portion 123 in the pivot grooves 128.

The shape of the second species of foot is somewhat modified to provide a configuration having the essential elements of the first species, but being somewhat flatter than the first species, that is its radial extension is somewhat less. The side plates 29 of the first species have been removed as they are not necessary if the foot is constructed of material that has appropriate strength and rigidity.

This second species of foot provides the same benefits as the first species, but is somewhat more economical to manufacture.

A third species having a different foot support structure is shown in FIGS. 8-11. Here foot support 220 is formed as a unitary element of a trough-like "U" shape and has substantially the same lateral extension as the width or lateral extension of a foot to be supported. The foot support provides radially inner rounded back 221 interconnecting angulated outwardly flaring legs 222 defining enlarged rounded outer edges 223 to provide a bearing surface for pivot of the edges in pivot grooves 228 defined in foot bottom 226. The rounded back 221 of each foot support defines bolt hole 224 in a laterally medial position to receive bolt 231 to releasably and articulatingly interconnect the foot structure thereto. Medial support plates 225 extend in structural interconnection between flaring legs 222 and define medial holes 227 to receive and allow the passage of bolts 231. The support plates are medially positioned in the foot supports so that their ends on the inner surface of legs 222 are substantially adjacent the ends of the intersected wheel rim 217 on the outer surface of those legs.

This third species of foot support 220 is structurally joined to wheel 10 by welding. The foot supports are positioned at each apex of the wheel and necessary portions of the wheel web 213 and peripheral rim 217 are cut away to provide a channel within which the rounded back 221 and radially inner portion of legs 222 fit for welding joinder.

The foot structure and cleat, if used, that are supported by this foot support are positionally maintained by bolt 231 and associated nuts 232. The bolts extend through appropriate holes defined in the foot bottom 226 and cleat 235 and through holes 224 in rounded back 221 to releasably interconnect the foot and foot support structures in an articulating fashion shown in FIG. 9 and as described for the first and second species. If the configuration of the cleat and foot are such as to allow the cleat to rotate relative to the foot, the bolt 231 may be modified by flattening a portion of its shank (not shown) or replaced by a flat element (not shown) similar to fastening arms 31 of the first species to prevent any such cleat rotation.

This third species of foot support has been found to be simple of construction, strong and durable and is more economical of manufacture than the other species.

Preferably all elements of my footed wheel except the bearings 30 are formed of metal to accommodate the stresses and strains commonly placed upon them, and if they are so formed, the various structurally joined elements are preferably joined by welding, except where otherwise specified. The absolute dimensioning of the various elements of my wheel to provide wheels of different sizes is not critical, but the relative dimensioning must be maintained as indicated to provide operability. The foot width may vary, but the length, that is the elongate dimension in the direction of wheel travel, must be such as to allow adjacent feet to move relative to each other without mechanical interference.

Having described the structure of my invention, its operation may be understood.

A footed wheel is formed according to the foregoing specification and one or more of those wheels are placed in operative position on an irrigation system 12 to be serviced. A portion of a common type of tower supported, circularly transitting irrigation system is illustrated in FIG. 1 where it is seen to provide wheel base 39 supported at each end by my footed wheels and in turn supporting tower structure 40 which carries elongate horizontally oriented irrigation pipe 41 interconnected by input portion 42 to a water source (not shown). Such systems are powered by known apparatus (not shown) to provide wheel rotation for locomotion and provide various sophisticated mechanism to regulate their operation. It is with such an irrigation system that my wheel is designed to operate, but it is not limited in its scope to the particular system partially illustrated and described and will function on many wheel supported irrigation systems.

The operation of my wheel during system locomotion may be understood with reference to FIGS. 4, 6 and 10 where the wheel is shown with one foot in lower position for support on a surface therebeneath. It is to be noted that with the foot in this position, and with a wheel rotation in a counter clockwise direction, the lower foot supports at least the forward flaring portion of the associated foot support. Since the foot bottom is interconnected with its associated foot support in a loosely articulating fashion, as the wheel moves forwardly or to the left in the Figures, the support force on the ground contacting foot will remain at the forward portion of foot plate. The next forwardly foot will move toward a supporting lower portion with its rearward portion first coming into a support contacting position. This motion will continue until the next adjacent forward foot begins its supporting function on the rearward flaring portion of that foot support. The wheel motion will continue until the rearward foot is out of supporting mode and the forward foot is in the same position as was initially described for the rearwardly adjacent foot. This pivotal motion of the feet about two spaced pivot elements of the foot supports lessens the vertical distance that the wheel 10 will move as compared to a wheel having similarly arrayed feet with a single pivot support.

The operation of the cleated species of my wheel is seen in FIG. 7 of the drawings. Cleat 35 provides additional traction for the wheel if such additional traction is needed in traversing irregular terrain, moving up inclines or moving through ruts, and it also tends to dislodge and discourage accumulation of debris on the foot. The cleat may move pivotally relative to the adjacent foot plate by reason of the somewhat loosely articulated linkage interconnecting the elements. As the wheel moves in a counter-clockwise direction in FIG. 7, if any slippage occurs, the wheel will cause increased pressure on the forward edge of the cleat to cause a reaction in the earth supporting the foot that will tend to apply pressure to the rearward edge of the cleat. This will force the forward edge radially inwardly and cause the rearward edge of the cleat to move radially outwardly to increase pressure on the rearward portion of the cleat and prevent or inhibit rearward motion of the foot lad.

It should be noted that as the footed wheel moves over supporting earth, the motion of adjacent feet relative to each other will tend to dislodge debris accumulated on or between the feet or between the feet other adjacent structure. This propensity toward debris dislodgement will be in addition to any dislodgement caused by gravity and the rotary motion of the wheel itself. In general, debris dislodgement will take place at the time the foot moves from supporting engagement with earth therebeneath or very shortly thereafter, so that there is a lessened tendency to form ruts in general and if ruts are formed, the propensity of the wheel is to redeposit material in the rut rather than in adjacent areas, as is the case with many round pneumatic wheels.

It should be further noted that the downwardly protruding pivot grooves on the lower surface of the foot bottom will tend to create laterally extending grooves as they pass over supporting earth and the area between adjacent feet will tend to allow the earth to move upwardly in that space to create ridges. These grooves and ridges will be perpendicular to the course of travel of the wheel and will tend to inhibit any flow of water along a rut or channel that may be created, which in turn will aid water dispersement and tend to lessen rut formation over a period of time as the wheel passes periodically over substantially the same course of travel.

The foregoing description of my invention is necessarily of a detailed nature so that specific embodiments of it might be set forth as required, but it is to be understood that various modifications of detail, rearrangement and multiplication of parts might be resorted to without departing from its spirit, essence or scope. Having thusly described my invention, what I desire to protect by Letters Patent, and

What I claim is:

1. A footed wheel for support of transitting irrigation apparatus comprising in combination:
    a rigid wheel having a web defining a medial hub with means for releasable fastening on an axle and polygonal periphery with a rim extending from the periphery;
    plural foot supports carried by the wheel web to extend radially outwardly at each vertex of the polygonal periphery of the wheel web, each foot support having spaced outwardly flaring legs defining outermost pivot elements extending perpendicularly to the hub;
    wheel feet articulatingly carried by each foot support, each wheel foot having a bottom defining medial, spaced, laterally and radially outwardly extending pivot grooves to receive the outermost pivot elements of the associated foot support for pivotal support; and
    fastening means communicating between each wheel foot and the associated foot support to maintain the wheel foot in articulating interconnection with the foot support.

2. The footed wheel of claim 1 further having:
    cleats carried on the outer surface of the wheel feet, each cleat having medial configuration to fit adjacent the medial portion of the associated foot bottom and circumferentially outer end portions extending a spaced distance beyond the pivot grooves, spacedly distant from the foot bottom, to cause limited motion of the cleat responsive to inwardly directed force of a supporting earth surface upon one of the circumferentially extending portions of the cleat, and
    the fastening means communicating between the foot and foot support communicating through the cleat to maintain the cleat in articulating interconnection with the foot support.

3. The footed wheel of claim 1 wherein:
    each foot support comprises a foot mounting plate structurally carried by the wheel web and supporting similar foot supports extending radially outwardly on each side of the foot support, and
    the fastening means communicating between the foot support and the associated foot comprise similar laterally positioned "L" shaped fastening arms, each having a longer arm portion carried by the wheel support to extend radially outwardly and a shorter arm portion extending laterally inwardly on the radially outer side of the foot.

4. The footed wheel of claim 1 wherein:
    the foot support is a unitary trough-shaped element structurally carried by the peripheral portion of the wheel web, and
    the fastening means communicating between the foot support and the associated foot comprise at least one bolt and nut combination extending through the foot support and through the associated foot.

5. A footed wheel for support of transitting agricultural irrigation apparatus, comprising in combination:
    a rigid wheel having a web defining a medial hub with means for fastening on an axle, said web defining
    a polygonal periphery supporting a circumferential rim extending angularly therefrom, and
    a plurality of foot mounting plates extending radially from the wheel web, through the circumferential rim and a spaced distance therebeyond at each vertex, each said foot mounting plate having means for interconnection of a wheel foot therewith; and
    a wheel foot carried by each wheel mounting plate, said wheel foot having
    similar foot supports carried on each side of the foot mounting plate and having radially outwardly flaring bodies extending therefrom, each said outwardly flaring body defining an outermost pivot portion extending perpendicular to the wheel hub, and spacedly distant from the other outermost pivot portion,
    a foot plate defining two spaced laterally extending pivot grooves each positioned to accept the outermost pivot portion of the associated foot support, and
    paired opposed fastening arms carried by the foot supports and having longer arm portions extending radially from the foot supports with shorter laterally extending arm portions radially outwardly of the foot bottom to articulately fasten the foot bottom with the pivot grooves in supporting communication with the outermost pivot portions of the foot support.

6. The footed wheel of claim 5 further including:

a cleat carried on the radially outer surface of each foot plate, said cleat having a medial portion similar to and positioned adjacent the medial portion of the foot plate between the pivot grooves, spaced lateral channels to receive the longer arm portions of the fastening arms to fasten the cleat in an articulating relationship on the radially outer surface of the foot plate, and portions of the cleat extending a spaced distance circumferentially beyond the pivot grooves, spacedly distant from the adjacent portions of the foot plate surface, to cause limited pivotal motion of the cleat responsive to radially inwardly directed force upon one of said extending portions.

7. The footed wheel of claim 5 wherein the outermost pivot portion of the outwardly flaring body of the foot support comprises a rolled portion for pivotal carriage in the pivot grooves.

8. The footed wheel of claim 5 wherein the outermost pivot portion of the outwardly flaring body of the foot support comprises the linear edge portion of the outwardly flaring body of the foot support.

9. A footed wheel for support of transitting irrigation apparatus, comprising in combination:

a rigid wheel having a web defining a medial hub with means for fastening on an axle and a polygonal periphery with a rim extending from the periphery;

plural foot supports structurally carried by the wheel web to extend radially outwardly at each vertex of the polygonal periphery of the wheel web, each foot support having a radially inner back and outwardly flaring legs, each leg having a radially outermost bearing portion extending perpendicularly to the hub, plural wheel feet articulatingly carried by each foot support, each wheel foot having a bottom defining medial spaced, laterally extending pivot grooves to sequentially receive the radially outermost bearing portions of an associated foot support for pivotal support therein; and at least one bolt and nut combination extending between each foot support and the associated foot to maintain the foot in articulating interconnection with the foot support.

10. The footed wheel of claim 9 further having:

a cleat carried on the outer surface of each foot, adjacent the outer surface of the foot bottom between the pivot grooves and extending circumferentially past the pivot grooves in spaced relationship to the foot bottom, so that radially inwardly directed force on one of the cleat portions outwardly from the pivot grooves causes pivotal motion of the cleat relative to the associated foot, and the bolt and nut combination extending through the cleat to maintain the cleat in articulating interconnection with the foot support.

* * * * *